March 3, 1964     J. R. ALBURGER     3,123,806
COMPOSITION OF MATTER, PROCESS AND APPARATUS FOR
VISUALLY INDICATING AND STORING ELECTRICAL DATA

Filed April 1, 1957     2 Sheets-Sheet 1

INVENTOR.
JAMES R. ALBURGER
BY Fulwider Mattingly & Huntley
Attorneys

March 3, 1964   J. R. ALBURGER   3,123,806
COMPOSITION OF MATTER, PROCESS AND APPARATUS FOR
VISUALLY INDICATING AND STORING ELECTRICAL DATA
Filed April 1, 1957   2 Sheets-Sheet 2

INVENTOR.
JAMES R. ALBURGER
BY Fulwider Mattingly & Huntley
Attorneys

United States Patent Office 3,123,806
Patented Mar. 3, 1964

3,123,806
COMPOSITION OF MATTER, PROCESS AND APPARATUS FOR VISUALLY INDICATING AND STORING ELECTRICAL DATA
James R. Alburger, 5007 Hillard Ave., La Canada, Calif.
Filed Apr. 1, 1957, Ser. No. 650,025
25 Claims. (Cl. 340—173)

My invention relates generally to means for visually indicating and storing electrical data and relates especially to an electrically-responsive composition of matter capable of both giving a visual indication of electrical impulses or information fed thereto, and for storing such information. My invention also relates especially to processes and apparatus for use in connection with the aforesaid composition of matter for producing visual displays and for storing electrical data.

The terms "visual indicator," "visual display," or "visual image" and the like are referred to herein as meaning any indicator, display or image which is visible to the normal human eye under visible light or under ultraviolet light. The terms "visible color" and "fluorescent color" are employed herein as meaning colors which are visible under visible light and ultraviolet light, respectively. The fluorescent colors produced by means of the invention to be described do not have any particular band or wave length of ultraviolet excitation.

Visual indicators or displays responsive to electrical impulses are probably best known in the form of the conventional television picture tube. Such visual displays must generally be viewed under subdued ambient light due to the limited brightness of the luminous image formed on the conventional phosphor screen. Further, the phosphor luminous screen is in general opaque to the extent that a viewer cannot see through it clearly. A two-dimensional effect only will thus result.

It is often desirable to have a visual indicator device which may be readily viewed in daylight or under high ambient light levels of white light, as for example, where it is desired to incorporate a radar plan-position indicator screen in a transparent window or windshield in an aircraft. In such cases, it is also necessary to have the visual indicator device transparent to the normal view. Such visual indicator devices would have two dimensions, as in the case of a television screen.

In other applications of a transparent display screen, it is frequently useful to have a visual indicator device which will show an image in three dimensions. For example, in connection with observation and control of aircraft in congested traffic patterns, it is advantageous to have a visual indication of a plane location in terms of the usual two coordinates as well as an indication of the altitude of the various aircraft. Conventional radar plan-position indicators do not provide such information, since they cannot show the third coordinate or altitude position in the display.

Another application of a three-dimensional transparent display screen is in the observation and control of guided missiles wherein a similar plan-position altitude indicating device is necessary to indicate the trajectory of the missile. Still other applications of a three-dimensional screen may be to produce a display of subterranean earth structure in connection with sonic prospecting for oil or minerals. Also, where three layers or three transparent screens are used one upon the other to show superimposed images with each layer responsive in a primary color, electrically controllable full color pictures, electrically controllable color filters, or decimal read-out cells can be produced.

It is apparent from the foregoing that visual display means having the characteristics of being transparent when non-activated and colored when electrically activated have many useful applications. Also, display means having any sort of visual response to electrical actuation are highly useful.

In order to produce the visual displays and images in terms of electrical impulses fed to the screen, a plurality of cells of restricted area are employed in which certain electrochemical phenomena occur. The application of electrochemical cells for use in color displays has been attempted hitherto, but has not met with any practical success. For example, in certain electrochemical cells, the electrodes have been made of an inert material, such as platinum, and the electrolyte has been of an ionizable salt solution, such as sodium sulphate in about a four percent concentration with a few drops of a one percent solution of phenolphthalein. With the feeding of electrical current to the cell, the cell will display or color red. The disadvantage of such electrically-responsive solutions is that they produce electrode reactions, specifically, gas bubbling. The end result is that (1) poor color change or change of fluorescence results, and (2) the cell is subject to deterioration caused by the electrode reactions and is then of no use.

In view of the foregoing facts, it is a major object of the present invention to provide a composition of matter which has the property of providing a sharp visual display in response to electrical activation.

It is another major object of the present invention to provide a composition of matter which will provide visual displays in response to electrical activation and will not be subject to deteriorations.

It is another object of the present invention to provide a colorless or transparent composition of matter which, upon electrical activation, luminesces under visible light and/or fluoresces under ultraviolet light.

Still another object of the present invention is to provide a transparent liquid or jelly-like composition of matter which, when subjected to electric impulses of a certain critical magnitude, provides visual displays under either visible or ultraviolet light.

A further object of the present invention is to provide a transparent or colored composition of matter which, when subjected to certain electrochemical phenomena, provides thereby visual indications of electrical current fed to the composition, said composition of matter including an electrically-responsive indicating material, a chemical activating means, and a solvent for the indicating and activating means.

Yet another object of the present invention is to provide a composition of matter which, upon electrical activation, responds in terms of a visual display, and upon termination of the electrical activation, retains the visual display for a variable controllable period of time.

Still another object of the present invention is to provide a composition of matter which will, in response to certain electrical impulses, give a visual response, the intensity of which increases substantially linearly with the amount of electrical current fed to said composition.

It is a further object of the present invention to provide a point cell or cell of extremely small dimensions responsive to electrical energy which gives visual indications of said energy.

Still another object of the present invention is to provide a cell, which may be transparent or colored, and which responds to electrical current fed to the cell to provide visual indications of said current, either by a change from colorless to a color, by a change from a color to colorless, or by a change from one color to a second distinct color, when viewed under visible or ultraviolet light, the intensity of said visual response varying linearly with the amount of input electrical energy.

Another object of the present invention is to provide a process for producing visual displays or indications employing the composition of matter of my invention.

Yet another object of my invention is to provide a process wherein electrical energy is passed through a composition of matter, the voltage being maintained within critical limits to produce the desired visual change.

It is still another object of my invention to provide a matrix of cells of my invention adapted to produce a visual image in response to an electrical input.

A further object of my invention is to provide a two-dimensional transparent or colored screen composed of a plurality of cells of my invention in a grid or matrix structure, each cell having a characteristic visual response to electrical input to thereby produce an over-all visual image.

Yet another object of my invention is to provide a substantially flat transparent matrix of cells through which the normal human eye can readily see and which will, upon electrical energy being fed to said matrix of cells, produce a visual display in accordance with said electrical energy.

A still further object of my invention is to provide two or more layers of cell matrices through which the normal human eye can readily see, said plurality of layers, upon electrical excitation, showing superimposed images in varying colors thereby producing a three-dimensional visual display.

It is still another object of my invention to provide a stack of transparent cells to thereby form a sandwich structure, said sandwich structure, upon electrical excitation, producing superimposable vari-colored visual displays.

In addition to the visual display characteristics of my electrochemical cell, I have found that a storage of energy within the cell occurs upon proper electrical activation. The electrical energy may be stored within the cell for a variable and accurately controllable period of time, ranging from a fraction of a second to a substantially permanent storage condition.

The memory effects or storage properties of my electrochemical cell are highly useful in the storing of electrical data fed to it. For example, a cell which has been activated in response to a given electron beam can be later re-scanned and the stored data taken off electrically.

In the past, such data storage devices have been usually of either the magnetic type, such as the magnetic drum storage type or the magnetic core storage type, or of the capacitative or condenser type. The electrochemical method of storing data is both simple and inexpensive to manufacture in comparison with the conventional magnetic or capacitative systems, and is additionally advantageous in that the stored information can be viewed visually, if desired, prior to the removal of the stored data.

Accordingly, it is another major object of my present invention to provide a simple and inexpensive electrochemical cell having data storage properties whereby electrical energy fed to the cell may be stored for a predetermined accurately controllable period of time.

It is another object of my invention to provide a data storage device comprising an electrically sensitive cell which can be re-scanned or otherwise re-evaluated electronically by computer techniques to yield the stored data in the form of electrical impulses, and in which the stored information can be viewed visually within the cell prior to its removal therefrom.

These and other objects of the present invention will become readily apparent by referring to the following description and to the accompanying drawings, in which:

FIGURE 5 is a schematic representation of the matrix of cells shown in FIGURE 3, electrically connected to a typical scanning circuit;

The principle of my invention depends upon a novel property of electrolytically conducting liquids that I have discovered.

When a direct current is passed between two inert electrodes immersed in an electrolytically conducting liquid, the result will be that the negative ions of the electrolyte are drawn to the positive electrode, while positive ions are drawn to the negative electrode. The ions become electrically neutral on the electrode to which they are attracted and are either plated out or enter into reactions which result in the formation of gas bubbles at the attractive electrode, depending upon the electrolytic system. For example, in the case of chemically inert electrodes, such as platinum, immersed in pure water slightly acidified with sulphuric acid, a direct current between electrodes will generate electrically neutral oxygen bubbles at the positive electrode and electrically neutral hydrogen bubbles at the negative electrode. And, there will be a surplus of hydroxyl ions at the negative electrode and a surplus of hydrogen ions at the positive electrode.

It will be evident to those skilled in the electrochemical arts that the accumulation of ions at the electrodes in response to an electric current represents a shift of ion unbalance in the vicinity of the electrodes. In the usual electrolytically conducting solutions, the region of ion predominance (e.g., the hydroxyl ion region and hydrogen ion region in the above illustration) is, however, but a microscopically thin layer found at each electrode surface. On the other hand, I have found that by employing an ionizable liquid in such minute proportions as to produce an ion content within the liquid which is equivalent to the bare minimum necessary to produce a minute electrical conductivity, the zone in which an ion shift or unbalance occurs in the liquid about each electrode may be made to extend from the electrode surface for a distance which is substantially larger from the standpoint of molecular dimensions. For example, this zone of ion unbalance may project as much as $1/16$ inch about the surface of the electrode. I have discovered a number of chemical compounds which can be dissolved in solvents such as water, alcohol and the like which will provide a visible indication of the zone of ion unbalance produced.

Furthermore, I have found that in the solution just described the usual electrolytic effects of plating or gas bubbling at the electrodes are either so minute as to be not visible, or are not present at all. The deterioration of the composition of matter is thus negligible.

For purposes of definition in the specification and in the claims, the term "electroflor" defines generally any compositions of matter of my invention which are responsive to electric inputs, either by means of a visual response, or by means of an electrical storage response, or both. The term "storage responsive (SR) electroflor"

defines specifically an electroflor composition of my invention which exhibits only electric storage or "memory" effects in accordance with input electric energy. The term "visual and storage responsive (VSR) Electroflor" includes specifically those compositions of my invention which respond (1) visually and (2) by storing electrical data, in accordance with the input electrical information. The electrically retentive properties of a VSR electroflor may be made as brief as a microsecond, but are nonetheless included in the definition thereof. The "VSR electroflor cell" and "SR electroflor cell" are cells of my invention which incorporate VSR electroflor and SR electroflor compositions, respectively.

By way of further definition, the SR and VSR electroflors each include a substantially non-ionizable electroflor solvent, the function of which is to dissolve and dilute an electroflor activator, the activator itself furnishing substantially all the ionizable material in the electroflor composition.

Referring now only to the VSR electroflor cell, the electroflor solvent also serves to dissolve an "electroflor indicator," the indicator, when in appropriate solution with an electroflor activator, being a material which is capable of exhibiting visual changes under visible or ultraviolet light, in response to input electrical energy either by a change from colorless to color or vice versa. The SR electroflor cell does not include an electroflor indicator, as will be seen hereafter.

Figure 1:
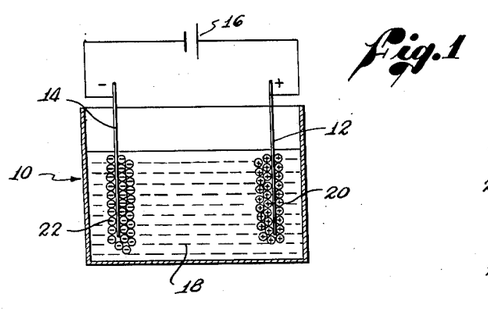
FIGURE 1 is a schematic representation of the cell embodying my invention.

Referring now to FIGURE 1, an electroflor cell of my invention is shown schematically and designated by the numeral 10. The cell 10 is composed of a pair of spaced electrodes 12 and 14, respectively, these electrodes being connected to an external electrical circuit. The electrode 12 is connected to the positive side of a source of the electrical activation means, designated by battery 16, while the electrode 14 is connected to the negative side.

The electrodes 12 and 14 are immersed in an electroflor composition 18 which may be of the VSR electroflor type or the SR electroflor type.

In order to clearly describe the mode of operation of the schematic cell 10, a representative VSR electroflor, one of many possible VSR electroflors, as will be hereafter described, is set forth below:

COMPOSITION I—VISIBLE RED RESPONSE

| | Parts |
|---|---|
| Electroflor solvent: | |
| Water | 85 |
| Isopropanol | 15 |
| Electroflor activator: NaCl | 0.05 |
| Electroflor indicator: Phenolphthalein | 0.05 |

The essential feature of my electroflor formulations, whether of the VSR or SR types, is that they be made with an extremely small amount of ionizable material. The concentration of 0.05% given above is a typical one. If too large an amount of ionizable material is employed, the electrical conductivity is increased, but electrode reactions occur which cause a plating out or the formation of gases, depending upon the particular ions involved.

If a proper amount of ionizable material is employed, the zone of ion production about each electrode is substantially increased in thickness and the usual electrolytic effects are substantially entirely avoided.

If then a small voltage, e.g., about 1.5 v. is applied to the cell 10 by means of battery 16, an ion unbalance of considerable proportions is caused to exist about each electrode 12 and 14 in the following manner.

About the negative electrode 14, the positive hydrogen ions probably combine to form a nascent or unreactive form of hydrogen molecule, thus producing a surplus zone of negative $OH^-$ (hydroxyl) ions about the negative electrode 14. Evolution of hydrogen gas, if present, is not visible. About the positive electrode 12, the negative hydroxyl ions are probably oxidized to form nascent or unreactive oxygen molecules, thus producing a positive $H^+$ (hydrogen) ion zone about the positive electrode 12. There is no visible indication of oxygen gas bubbling off. The zones of ion unbalance produced about the electrodes 12 and 14 are designated by numerals 20 and 22, respectively.

The ion unbalance produced can be seen to represent also a pH variance or unbalance, the pH at the positive electrode 12 lying below 7, while the pH of the zone 22 is above 7. When a sufficient ion or pH unbalance has been produced so that the pH of the zone 22 reaches 8.3, the electroflor indicator phenolphthalein, present in the electroflor 18, will immediately react within the zone 22 to produce its characteristic red color and color the entire zone 22. As the input of electrical current is continued, the intensity of the coloration increases linearly therewith apparently because of the increasing build-up of depth of the zone 22.

On the other hand, if too large an amount of ionizable material is employed, the usual electrolysis effects will occur, and the cell will be subject to relatively rapid deterioration. Bubble formation will also occur at the electrodes greatly obscuring color changes or change in fluorescence that might occur. Such color changes also do not increase linearly in intensity with increasing input of electric current.

The minimum amount of total ionizable material that should be present in the electroflor 18 varies within quite narrow ranges and is of the order of magnitude of 0.01 percent. At concentrations very much below 0.01 percent, the conductivity of the liquid becomes extremely small and difficulty is usually encountered in building up the zone of ion unbalance. That is to say, a zone of color may be slowly developed, but high voltages of the order of 20 volts or more are necessary to produce the color in comparison with voltages of the order of 1–5 volts usually employed with my electroflor solutions 18.

The upper extreme of the range is, in some cases, as high as one percent. Above this upper limit, as mentioned, substantial bubbling and electrode reactions begin to occur and tend to obscure the ion shift, rendering effective performance of the cell impossible. The optimum concentration of ionizable material in the electroflor 18 is found to be 0.05% ±0.01%.

The maintenance of an optimum amount of ionic material in the solution 18, in addition to introducing a large zone of ion unbalance, exhibits a high degree of sensitivity to electrical energy imparted to it. The extreme electric sensitivity enables a proportionately large change in pH value to occur as a result of an extremely small input current. This means that the zone of color can be rapidly obtained.

The zone of color response 22 can be even more rapidly obtained if a slight amount of alkali is added to the electroflor 18. Thus, if 0.0003 percent of sodium hydroxide (NaOH) is added, the pH of the solution 18 is brought closer to the color range of the phenolphthalein and the electroflor system is thus made still more sensitive to input electrical energy.

The zones of color response may occur at either the negative electrode 14 or the positive electrode 12, depending upon the electroflor indicator. For example, the electroflor indicator quinine sulfate exhibits a blue-white fluorescent response at the positive electrode, while phenolphthalein exhibits a visible red response at the negative electrode, as above described.

Specifically referring now to the electroflor indicators, the most satisfactory electroflor indicators are those which show a very sharp color change with a slight change of pH in the zone of ion unbalance, thus indicating that changes of pH in this zone are definitely a characteristic of the zone. The zone of ion unbalance may involve other characteristics, but this is the most obvious one. Conversely, the least satisfactory electroflor indicators are those which show a color change only at extremes of the pH scale, i.e., at 0—1, and 13—14. In such cases, the zone of ion unbalance is not capable of being readily shifted far enough to produce the color change without, at the same time, producing bubbling and other reactions.

The addition of basic or acidic ionic material to produce a pH close to the color changeover point and to rely on the electrical production of a zone of ion unbalance to shift the pH into the color region of the particular indicator is not satisfactory because the base or acid necessary to produce the extreme pH, in the first place, is generally too great an amount over the total allowable ion content. For example, addition of one percent NaOH to an electroflor indicator and solvent brings the pH up to about 12, but the amount of ionizable material is so great as to cause the usual electrolytic effects with consequent poor color response. Except for these practical limitations enumerated above, I have found that any fluorescent or non-fluorescent indicator material which is pH sensitive can be employed in my VSR electroflor compositions as an electroflor indicator. The following list of indicators are merely representative of the great variety of substances that have been found usable:

In the following classification of materials, the term "colorless" refers to a condition which to the normal view and for practical purposes is without visible color or fluorescence.

*Table 1.—Electroflor Indicators Which Show a Change From Colorless to a Fluorescent Color*

| | |
|---|---|
| 1,3,6-tribromo-2-naphthol | Colorless–dull violet. |
| 2,4-dibromo-1-naphthol | Colorless–dull green. |
| 1-naphthol-2-sulfonic acid, sod. salt | Colorless–blue. |
| 1-naphthol-4-sulfonic acid sod. salt | Colorless–blue. |
| Quinine sulfate | Colorless–blue-white. |
| 2,4-dichloro-1-naphthol | Colorless–green-white. |
| 2-naphthol-7-sulfonic acid, sod. salt | Colorless–blue. |
| Beta-methyl umbelliferone | Colorless–blue. |
| Phloxine | Colorless–orange. |
| Eosine | Colorless–yellow-green. |
| 5,7-dihydroxy dimethyl coumarin | Colorless–blue. |
| 5,7-dihydroxy-4-methyl coumarin | Colorless–blue. |
| 4,5-dihydroxy-2,7-naphthalene-disulfonic acid disodium salt | Colorless–blue. |
| 6-amino-1-naphthol-3-sulfonic acid | Colorless–dull blue. |
| 6-amino-1-naphthalene sulfonic acid | Colorless–dull blue. |
| 1-naphthol-5-sulfonic acid, sod. salt | Colorless–yellow. |

*Table 2.—Electroflor Indicators Which Show a Change From One Fluorescent Color to a Different Fluorescent Color*

| | |
|---|---|
| 2-naphthol-6,8-disulfonic acid, disodium salt | Dull blue–bright blue. |
| 2-naphthol-6-sulfonic acid, sodium salt | Dull blue–bright blue. |
| 7-amino-1,3-naphthalenedisulfonic acid | Dull blue–blue. |
| 5-amino-1,3-naphthalenedisulfonic acid | Dull blue–White. |
| 2-naphthol-3,6-disulfonic acid, disodium salt | Dull blue–blue-white. |
| 2-naphthol-7-sulfonic acid, sod. salt | Dull blue–blue-white. |
| 2',7'-dichlorofluorescein | Dull yellow–bright green. |
| Acridine orange RRR | Dull yellow–bright yellow. |

*Table 3.—Electroflor Indicators Which Show a Change From Colorless to a Color Visible in White Light*

| | |
|---|---|
| 2-4 dinitrophenol | Colorless–yellow. |
| para-Nitrophenol | Colorless–yellow. |
| meta-Nitrophenol | Colorless–yellow. |
| Methyl violet | Colorless–violet. |
| Phenolphthalein | Colorless–red. |
| Phloxine | Colorless–orange. |
| Eosine | Colorless–pink. |
| Thymolphthalein | Colorless–blue. |

*Table 4.—Electroflor Indicators Which Show a Change From One Visible Color to Another Visible Color*

| | |
|---|---|
| Thymol blue | Yellow–blue (pos.)–red (neg.). |
| Sodium-nitrobenzeneazosalicylate | Yellow–red. |
| Bromo cresol purple | Yellow–purple. |
| Bromo thymol blue | Yellow–blue. |
| Cresol red | Amber–red. |
| Orthocresolphthalein (also fluoresces) | Amber–red. |

*Table 5.—Materials Which Show Relatively Poor But Usable Visible or Fluorescent Color Change Responses*

| | |
|---|---|
| 8-amino-1,5-naphthalenedisulfonic acid disodium salt | Dull yellow–yellow. |
| 1-amino-2-naphthol-4-sulfonic acid | Dull blue–white. |
| 7-amino-1-naphthol-3-sulfonic acid | Dull violet-blue. |
| 5-amino-2-naphthalenesulfonic acid | Dull green–greenish white. |
| 8-amino-1-naphthalenesulfonic acid | Dull blue–dull yellow. |
| 2-amino-1-naphthalenesulfonic acid | Violet–blue. |
| 4-amino-1-naphthalenesulfonic acid | Dull blue–bright blue. |
| 5-amino-2-naphthalenesulfonic acid | Dull white–bright green-white. |
| 1-amino-2-naphthol-4-sulfonic acid | Dull white–bright blue white. |
| 8-amino-2-naphthalenesulfonic acid, sodium salt | Dull yellow–yellow white. |
| 6-amino-1,3-naphthalenedisulfonic acid, disodium salt | Dull blue green–greenish white. |
| 2,4-dinitro-4'-hydroxydiphenylamine | Yellow–red. |
| Primuline | Dull blue–blue. |
| Fluorescein | Bright yellow–bright green |
| 2-amino-6-naphthalenesulfonic acid | Colorless–blue. |
| 2,4-dinitro-1-naphthol | Colorless–yellow. |
| Zinc-8-hydroxyquinoline | Colorless–yellow green. |
| 6-8-dinitro-2,4(1,H-3H,N) quinazolinedione | Colorless–yellow. |
| Quinaldine red | Colorless–red. |
| Congo red | Blue–red. |
| Alizarin red | Yellow–purple. |

Of the above electroflor indicators, I find that most may be dissolved in pure water or water and alcohol mixtures. Sufficient acid, such as hydrochloric, or base, such as sodium hydroxide, is then added to shift the pH of the solution to a value close to the color change-over point of the indicating compound. For example, many compounds, such as 2,4-dichloro-1-naphthol, show a fluorescence when dissolved in pure water. In such cases, it is only necessary to add a minute quantity of acid so as to decolorize the solution and remove the fluorescence. In other cases such as phenolphthalein, a minute quantity of alkali or base is added to the solution to bring its pH close to the point where the color change takes place, while keeping the solution colorless.

The concentration of the electroflor indicator may be varied within substantial limits. At the lower limit changes of color can be detected with concentrations as low as one part in a million, while the practical upper limit is a saturated solution of the indicator. It is not possible to specify the concentration within any specific numerical range since the electroflor indicators vary widely in the solubilities, color effect, light absorption and other physical properties.

The electroflor solvents are those compounds, organic or inorganic, which will dissolve the particular electroflor indicator or indicators desired. Examples of such organic solvents are the alcohols, glycols and glycol ethers. Water is an example of one of the most useful inorganic materials employed as an electroflor solvent, to dissolve the electroflor indicator and/or electroflor activator.

The use of alcohols, glycols, etc., is particularly useful when, for example, it is desired to use a water insoluble electroflor indicator or where it may be found that a particular electroflor solvent has certain advantages over water in its physical or chemical properties, as, for example, refractive index.

It is advantageous, in some cases, to employ various combinations of electroflor indicators. For example, I may wish to combine a red electroflor indicator which can be viewed in daylight with a fluorescent blue electroflor indicator which can be viewed at night under ultraviolet light. It also may be necessary, in order to maintain both types of indicators in solution, to employ a mixture of electroflor solvents, such as alcohol and water. It is therefore within the scope of this invention to employ various combinations of electroflor solvents, as well as various combinations of indicators in the electroflor composition 18 or cell 10.

Any substance in the electroflor solution 18 which ionizes to any extent must be included in determining the total ionizable concentration. The barely ionizable materials, such as water or very weak acids and bases, are not ordinarily included in the category of ionizable materials. The organic electroflor solvents do not ionize so that, as a class, the electroflor solvents are not considered ionizable.

The ionizable materials, whether they be acid, base, salt are termed electroflor activators, as described heretofore. Some of the electroflor indicators may, however, substantially contribute to the total ion concentration and must, therefore, be included as ionizable material or as electroflor activators. Examples of such ionizable electroflor indicators are the sodium salts of the naphthalenesulfonic acids.

Having described examples of the constituents of each class of materials that comprise an electroflor 18, it will be understood that there are very many possible electroflor solutions. The following are merely a few preferred examples for the uses indicated:

COMPOSITION II—VSR (VISIBLE RED) ELECTROFLOR (SUBTRACTIVE PRIMARY)

| Electroflor solvent: | Parts |
|---|---|
| Distilled water | 85 |
| Isopropanol | 15 |
| Electroflor Indicator: | |
| Phenolphthalein | 0.05 |
| Electroflor activator: | |
| Sodium chloride | 0.05 |
| Sodium hydroxide | 0.0003 |

It will be noted that Composition II is identical to Composition I except for the addition of 0.0003 parts of NaOH. The addition of NaOH makes Composition II more color-sensitive to electric current than without, for reasons previously explained.

COMPOSITION III—VSR (VISIBLE BLUE) ELECTROFLOR (SUBTRACTIVE PRIMARY)

| Electroflor solvent: | Parts |
|---|---|
| Distilled water | 50 |
| Isopropanol | 50 |
| Electroflor indicator: | |
| Thymolphthalein | 0.05 |
| Electroflor activator: | |
| Sodium chloride | 0.05 |
| Sodium hydroxide | 0.0003 |

Composition III will function without the sodium hydroxide, but its presence makes the electroflor more responsive to electrical current.

COMPOSITION IV—VSR (VISIBLE YELLOW) ELECTROFLOR (SUBTRACTIVE PRIMARY)

| Electroflor solvent: | Parts |
|---|---|
| Distilled water | 100 |
| Electroflor indicator: | |
| Para-nitrophenol | 0.05 |
| Electroflor activator: | |
| Sodium chloride | 0.05 |
| Hydrochloric acid | 0.0008 |

The hydrochloric acid renders the electroflor colorless and transparent, so that the color responses will show in visible light against a colorless background.

COMPOSITION V—VSR (FLUORESCENT BLUE-WHITE) ELECTROFLOR

| Electroflor solvent: | Parts |
|---|---|
| Distilled water | 50 |
| Isopropanol | 50 |
| Electroflor indicator: | |
| 2-4 dichloro-1-naphthol | 0.02 |
| Electroflor activator: | |
| Sodium chloride | 0.05 |

This solution has a colorless (water clear) non-fluorescent background.

COMPOSITION VI—VSR (FLUORESCENT BLUE) ELECTROFLOR

| Electroflor solvent: | Parts |
|---|---|
| Distilled water | 100 |
| Electroflor indicator: | |
| 1 napthol-2-sulfonic acid | 0.02 |
| Electroflor activator: | |
| Sodium chloride | 0.05 |
| Hydrochloric acid | 0.0003 |

It should be noted that the visual response of the cell 10 in addition to going from colorless to a color, can be just the reverse, that is, proceeding from a color to colorless. Again, this is a matter of pH adjustment of the electroflor 18. For example, if a phenolphthalein electroflor solution 18 had a pH of 8.5, the solution would be colored visible red. If then, electric current were fed to the cell 10, the zone of ion unbalance 20 produced at the positive electrode 12 would become lowered in pH to below 8.3, the color turn-over point of phenolphthalein, at which point a colorless zone would appear about the electrode 12.

I have found that, in order for the electroflor cell 10 to function in the desired manner to produce either fluorescent or visibly colored visual displays, the electrical information sent to the cell 10 must be fed within certain specified ranges. That is to say, there is a certain threshold voltage that must be exceeded before the zone of visual display becomes visible. There appears to be a tendency for diffusion of the ions from the zones of ion unbalance 20, 22 to their normal state. In order to generate a sufficiently thick zone of color response, the voltage must be raised to a certain minimum level or threshold where generation of a color zone 20 or 22 is more rapid than its dissipation by molecular diffusion. For the electroflor indicators enumerated herein, dissolved in the minimum amount of organic solvent necessary, and with approximately 0.5 percent electroflor activator, approximately 0.7 v. is found to be the threshold voltage. The minimum current flowing through the cell at this time is approximately 0.1 microamp per square millimeter of electrode area.

There is also an upper limit of voltage beyond which a color change in the cell 10 takes place with accompanying electrolysis or gas bubble formation. The upper limits of applied voltage are determined by the amount of current impressed upon the cell 10, the current flow being less than that required to cause the usual electrolytic effects to occur. The upper limit of voltage current varies for each particular electroflor system.

In general, the electrical energy may be applied either in the form of discrete current pulses, the source of energy being any suitable means such as a D.C. generator, or in the form of continuous direct or alternating current. Small amplitude alternating currents can also be employed provided that the frequency of the alternation is sufficiently low to enable an electroflor response to be built up at one or the other of the electrodes 12 or 14. It may be desirable in some instances to apply a zero net D.C. current to the electroflor cell; i.e., the current may flow in one direction, then in the reverse direction to cancel the previous pulse. In such cases, the activating voltage may be, for example, applied in pulses through a condenser.

The maximum overload that most electroflor compositions or systems 18 have been found to sustain without electrode reaction varies somewhat from system to system. Hence, a numerical value of overload current cannot be given that will be accurate for all systems. The following is given merely as an order of magnitude: a current of 1.0 microamp per square millimeter of electrode area is found to result in overloading an electroflor of Composition III.

The brightness or intensity of the color response in response to the current passage above the threshold voltage and below the upper limits described above is substantially linear. That is, the product of current times its duration determines the brightness or intensity of the color produced. This phenomena has useful applications, which will be described later.

Upon cessation of the electrical current or impulses fed to the cell 10, the color change made in response to electrical activation is generally retained within the cell after termination of electrical excitation, for a period of time which may vary from a fraction of a second to several minutes. Such a property of the cell 10 is highly advantageous where it is desired to retain a fluorescent or colored image for an "afterglow" effect.

The afterglow is controlled by adjusting the pH of the electroflor solution 18 with respect to the point of color change of the electroflor. If a long afterglow is desired, the pH of the electroflor 18 is adjusted so that it will initially be as close as possible to the color-changeover point, e.g., a single unit of pH. Then, as the current is applied, the zone of ion unbalance is created and the ions in the zone of ion concentration increase proportionately, causing greater alteration of the pH in the zone. Upon current turn-off, the color persists inasmuch as the ion zone does not immediately disperse but diffuses to its normal neutral state in accordance with the physical properties of the particular electroflor. The color zone or afterglow remains until the diffusion of ions from the zone of ion unbalance has returned the pH of the zone to the color turn-over point of the indicator. Thus, it will be seen that the greater the pH alteration away from the indicator color turn-over point that can be made during electrical activation, the greater the color persistence or afterglow. For this reason, the pH of the solution 18 is initially kept close to the indicator turn-over point so as to achieve the greatest alteration.

The diffusion of ions from the zone of ion unbalance may be minimized through the use of thickening agents such as, for example, gelatins, thus further lengthening the time of afterglow.

In many cases, it is necessary to produce an extremely short afterglow time, e.g., a fraction of a second. In such cases, the pH of the electroflor 18 is set at a point distant from the color-changeover point of the particular electroflor solution, for example, by the addition of 0.01 percent of an indicator having a turn-over point at about pH 6-9. Upon the color zone being produced, and the energy input discontinued, the color turn-over point is very quickly reached and the glow time shortened. The glow time can be shortened even more by impressing a reverse pulse of current across the electrodes 12 and 14 to thereby cancel the zones of ion unbalance previously produced.

It will thus be seen that by adjustment of the pH of the electroflor, or by use of reverse pulses of current, or by both, an afterglow in the cell 10 can be obtained ranging from a fraction of a second to several minutes. It must be borne in mind that adjustment of the pH has certain limits, as mentioned previoulsy; the pH adjustment cannot be so great as to present a total of over one percent of activating ionizable material, and preferably, should not present a total of over about 0.05% ±0.01% into the electroflor 18.

All the VSR electroflor compositions above enumerated, as well as the numerous other components listed, have been found to have, in addition to a visual mode of response, a data storage response in the form of a potential difference between electrodes 12, 14 which is directly proportional to the electrical information fed to the electroflor 18. This "memory" effect is exceedingly useful in data storage devices such as computing machines where the electrical information fed can be later rescanned or taken off electrically.

The "memory" effect or energy storage characteristic appears to be due to the accumulation of ions at the electrodes in the zone of ion unbalance previously described, the ions apparently remaining in an unreactive state until removed from the zone by diffusion or by electrical means. The zone of ion unbalance produces a potential difference between electrodes which is substantially a linear function of the applied electrical energy.

When considering the electroflor cell 10 purely as a data storage device, the presence of an electroflor indicator may be entirely neglected except where the indicator contributes to the ionizable content of the electroflor. Thus, for example, VSR electroflor Composition I, with or without phenolphthalein as the electroflor indicator, has similar electrical storage characteristics.

When utilizing a VSR electroflor solely as a storage responsive cell, the electrical energy must still be fed to the cell 10 below similar upper limits of voltage and overload, as described with reference to the electroflor when used as a visual display means; otherwise, bubbling and the usual electrode reactions will occur, and the storage effects are destroyed. So far as the data storage properties are concerned, it is found that substantially lower pulses of energy can be fed to the VSR electroflor for electrical storage response than for visual response. The lower limit for data storage response for VSR electroflors is of the order a microsecond at a few volts, or a micro-volt for a second or so, while a color zone is not built up in a VSR electroflor until substantially longer pulses are fed to the cell 10.

If the electroflor indicator is entirely omitted from the VSR electroflor composition, it is an SR (storage responsive) electroflor. The SR electroflor thus comprises an electroflor solvent and an electroflor activator ionizable solute. The solvent is usually water, although organic solvents, such as alcohols, glycols or glycol ethers may be employed. The ionizable solute is selected from acids, bases, or salts, although ionizable salts are usually employed.

The optimum conditions for creating the desired storage effect in the SR cell are achieved by maintaining the concentration of ionizable solute material at 0.05±0.01 percent. The practical limits of ionizable solute or electroflor activator concentration are between 0.01 and 1 percent. In concentrations very much below 0.01% the conductivity of the liquid becomes so small that sizable time durations of applied current pulses are usually required to build up the zone of ion unbalance. Above 1% concentrations, electrode reactions occur which destroy the storage effects.

Examples of an SR electroflor are the following:

COMPOSITION VII

| | Parts |
|---|---|
| Distilled water | 100 |
| Sodium chloride | 0.05 |

COMPOSITION VIII

| | |
|---|---|
| Distilled water | 100 |
| Hydrochloric acid | 0.05 |

COMPOSITION IX

| | |
|---|---|
| Distilled water | 100 |
| Sodium hydroxide | 0.05 |

Electrical control responses of the SR electroflor cells are identical to those described with reference to the VSR electroflor when employed solely as a storage device, and need not be described again.

Electroflor indicators may be added to an SR electroflor to provide a means of visually checking the operation of the storage device. Electroflor indicators which change from one visible color to another or from one fluorescent state to a different fluorescent state, under ultraviolet excitation, have been found to be particularly useful as visual check means.

Having described various possible VSR and SR electroflor compositions and the operation of cell 10, the apparatus whereby my electroflors may be employed as visual indicating devices and as electrical storage devices will now be described, such apparatus showing, by way of example, the uses of the electroflor material. The examples are not intended to be inclusive of all the applications of my electroflor compositions.

Figure 2:
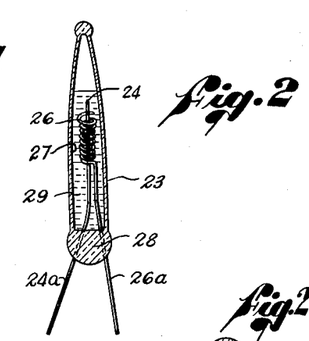
FIGURE 2 is a view in cross-section of one form of a single cell embodying my invention.

Referring now especially to FIGURE 2, an indicator cell especially adapted for use in transistorized computer circuits or other applications where visual indications are desired in low voltage circuits, is designated by the numeral 23. The indicator cell 23 is provided with a pair of spaced inert electrodes 24, 26, such as platinum, the electrode 26 being spirally wound about the electrode 24. The electrode leads 24a, 26a for electrodes 24, 26, respectively, pass through the enclosing wall 28 of the indicator cell 23 to a suitable source of electrical information which may be a current pulse, or continuous direct or alternating current. The energizing source is not shown.

The indicating cell 23 is substantially filled with a VSR electroflor composition 29 which contacts both electrodes 24, 26. Of course, an SR electroflor may also be used, if no visual display is required or desired.

As the energizing source is turned on, the color response is made to develop at the spiral electrode 26 rather than at electrode 24, so that the volume of glow generated will be visually greater. Since most color responses occur at the negative electrode, the electrode 26 will usually be made negative. Conversely, when the color response occurs at the positive electrode, as with quinine sulfate, the electrode 26 is made positive.

The electrode 26 may be in the form of a coating applied to the entire inner wall 27 of cell 23 in which case the color response area is maximized.

The proper voltage limits must be maintained, the exact limits depending upon the particular electroflor 29 employed in the cell 23.

Figure 2A:
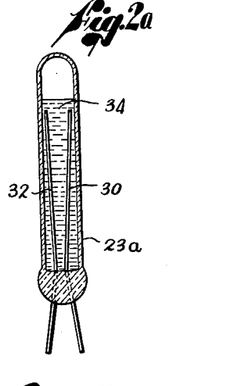
FIGURE 2a is a view in cross-section of a modified form of a single cell embodying my invention.

Another form of electrode positioning for use in the indicator cell 23a is shown in FIGURE 2a. Two electrodes 30, 32 are provided in the form of flat strips or wires immersed in VSR electroflor 34. The electrodes 30, 32 are spaced increasingly further apart from each other so as to form a uniformly diverging configuration. As electrical energy is supplied to the electrodes 30, 32, the color response is found to exist, initially where the two electrodes are closest. As the electrical input increases, the visual response spreads along the electrodes, but in proportion to the energy input. Thus, a clear indication of electrical energy input is given by the linearly increasing visual display upon the diverging electrodes 30, 32.

The presently preferred form of apparatus advantageously used in connection with plan-position altitude indicators, computing devices, television screens and the like, comprises a plurality of electroflor cells in a flat plate matrix structure, the size and number of matrix structures being determined by the particular application.

Referring now especially to FIGURES 3–6, the flat plate or two-dimensional matrix structures 40 comprise spaced strip or wire electrodes, immersed in electroflor solution, and lying at right angles to each other. Each pair of cross-over zones or points of the electrodes, immersed in the electroflor solution, acts as an individual electroflor cell. Thus, a plurality of color zones or points may be produced in accordance with input electrical current.

Figure 3:
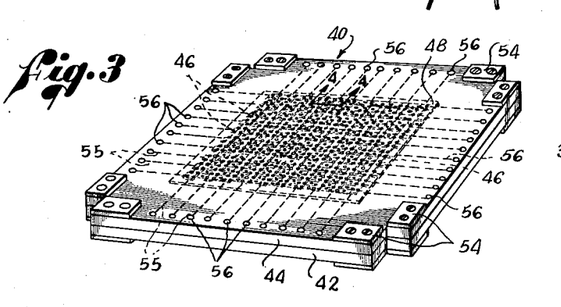
FIGURE 3 is a perspective view of a flat plate matrix of cells embodying my invention.
Figure 4:
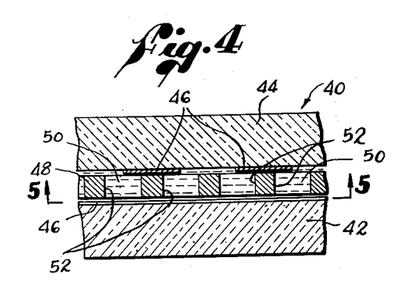
FIGURE 4 is a greatly enlarged view in cross-section along the line 4—4 of FIGURE 3.

The matrix 40 comprises a pair of transparent plates 42, 44, made, for example, of glass or an inert plastic material such as polyethylene or a polyvinyl compound, each plate carrying a series of parallel spaced electrodes 46. These electrodes 46 are affixed to the transparent plates 42, 44 as thin strip leads, or are coated thereon by evaporative or other techniques. Typical electrodes that may be evaporatively affixed to the plates are thin layers of gold, which are transparent. Sufficiently fine wires can also be employed as electrodes 46, so that, at a distance of 2–3 feet, they are not visible. The electrodes 46 are shown applied to each plate 42, 44 in the form of parallel strips, the plates being then juxtaposed so that the strips cross over each other at right angles, the cross-over zones so formed being designated by the numeral 45.

Between the plates 42, 44 is an intermediate barrier layer 48 or screen which spaces the electrode strips 46 and comprises a perforate material inert to the particular electroflor composition employed, such as an inert material being, for example, polyethylene. The electroflor material 50, either of the VSR or SR type, occupies the space between the plates 42, 44 and within the perforations 52 of the barrier 48, and thus contacts the strips 46.

The plates 42, 44 and barrier layer 48 are rigidly held together by means of screw clamping devices 54 positioned, for example, at each corner of the matrix structure 40, and may be enclosed by a peripherally-mounted gasket (not shown) to prevent leakage, if necessary.

Both ends of each of the electrode strips 46 are connected to leads 55 which, in turn, are connected to electrically conductive terminal connections 56 whereby the electrodes may be connected to sources of electrical information or energy pulses. Where the electrodes 46 cross over and are both in contact with the electroflor solution 50, it will be seen that an individual electroflor cell is formed. Thus, in zones 45, where the perforations 52 allow contact of the electroflor 46 with electroflor 50, an individual cell is formed.

The purpose of the barrier layer 48 is to restrict the color response to zones in close proximity to a cross-over zone 45, in the following manner. The potential gradient is greatest at the points where the electrodes 46 cross over in the matrix 40. Ion unbalance within the electroflor 50 occurs in the electroflor material in the zone 45 of cross-over, resulting in a color change at one (usually the negative) electrode 46 in the cross-over zone. If the current pulse which excites the visual response is prolonged, the color change would spread from the cross-over zone 45 along the entire length of the electrode 46, except for the presence of the barrier layer 48, which, in effect, isolates the zone 45 and prevents the build-up of the color zone along the electrode.

Figure 5:
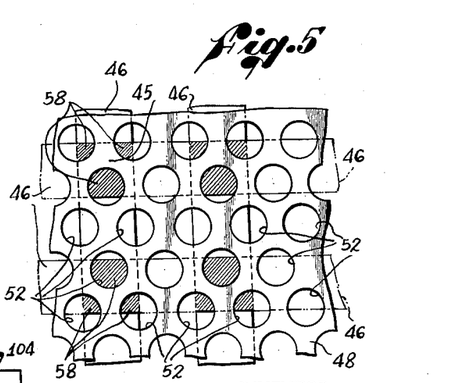
FIGURE 5 is a view along the line 5—5 of the matrix shown in FIGURE 4.

The number of perforations 52 outnumber the cross-over zones 45 so that at one cross-over zone, there occurs more than one discrete color area designated by the numeral 58 in FIGURE 5. At each color area 58, there is in fact an individual electroflor cell. The presence of a small number of closely packed color areas or cells 58 gives the visual sensation of a color area over the entire cross-over zone 45 without, in fact, spreading the color over the entire zone.

Figure 6:
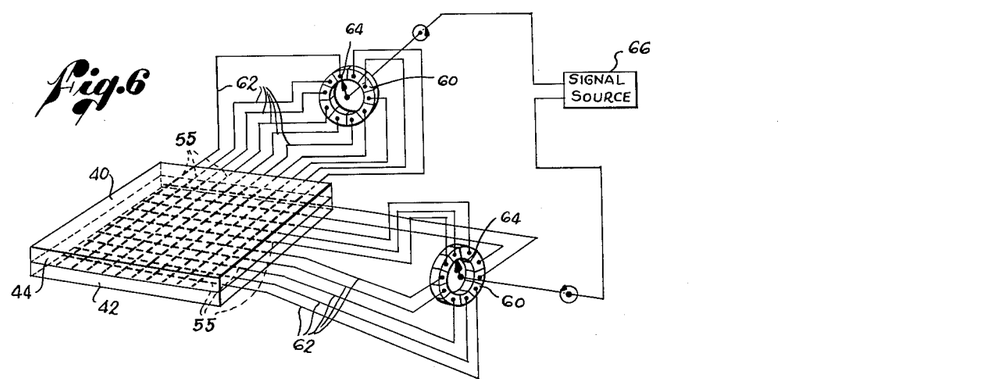

Referring now especially to FIGURE 6, one form of electric circuit for feeding information to the matrix 40 is shown. The external electric circuit consists of a pair of scanners 60 to which the electrode leads 55 are connected by means of leads 62 to an armature and brush arrangement, indicated schematically by the points 64. A signal source 66 provides electric pulses for the scanners 60 whereby the pulse of information may be fed to the proper cross-over zone 45 activating the electroflor cell or cells at the particular zone in question. It will be evident that other means may also be employed to scan the matrix so as to supply information, such as, for example, an electronic switching system or a moving electron beam.

Other external equipment which may be employed to feed information into the matrix 40 includes television pick-up devices, radar equipment computers and the like. It should also be borne in mind that the matrix 40 may be actuated manually by selecting appropriate lead wires and connecting a voltage thereto for a pulse of short duration.

It will also be evident that a flat matrix constructed with the electrodes arranged in a system of polar coordinates may be utilized in addition to the system of rectangular coordinates above described. Such a polar coordinate arrangement may be readily adapted to radar displays of plan and position. In the polar coordinate arrangement, one set of electrode wires or strips is arranged radially in the matrix, while another set of electrodes is arranged just above or below the radial electrodes, in concentric circles. Barriers between the electrodes may be inserted either radially or concentrically, or both. However, it has been found that the concentric arrangement is more convenient from the structural standpoint.

It will be evident that the flat plate or two-dimensional matrix 40 described above provides a means of producing both a visual display and a storage of electrical data, in response to rapid electrical current pulses. The visual displays, of course, are two-dimensional in character. However, it is desirable in many instances to have a visual display that is three-dimensional in character, that is to say, a visual display which comprises a plurality of transparent matrix layers 40 each responding to electrical energy impulses by a different and characteristic visual display. Such displays would be of great value in adding the third coordinate of altitude to a plan-position radar plot. Such a three-dimensional system would be of value in tracing the trajectory of guided missiles and in general would be of great value in plotting any three or more coordinate ssytem. In addition, other applications for such a transparent multilayer visual display lie in such fields as color television.

Figures 7, 8, 9:
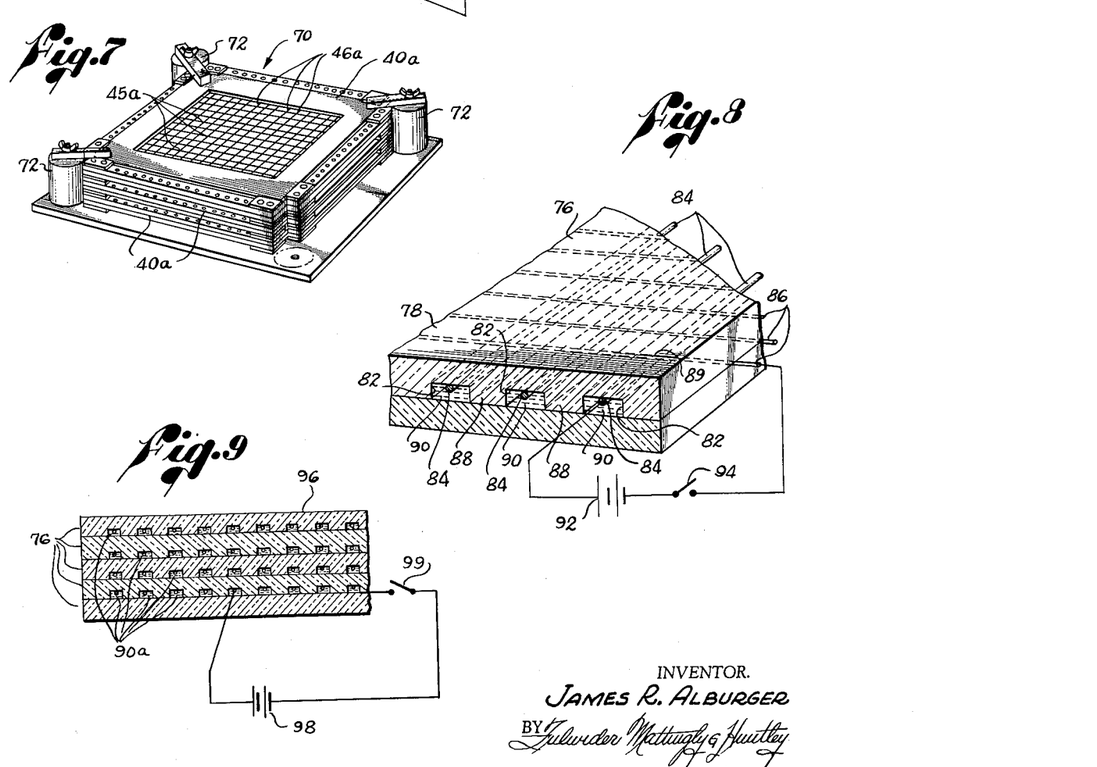
FIGURE 7 is a view in cross-section of a plurality of flat plate matrices, one of which is shown in FIGURE 3.
FIGURE 8 is a fragmentary perspective view of a modified form of a flat plate cell matrix embodying my invention.
FIGURE 9 is a view in cross-section of a plurality of cell matrices of the type shown in FIGURE 8, for multi-dimensional display or data storage purposes.

Referring now to FIGURE 7, a matrix stack 70 is shown which comprises a plurality of flat plate matrices 40a, held rigidly in place by corner clamps 72. Each matrix 40a comprises, for example, ten wires 46a per side of the matrix, thus resulting in one hundred crossover indicator points or zones 45a in contact with either a VSR electroflor or SR electroflor. The total number of indicator points or cells in a three-plate matrix would then be three hundred. Each of the electrode wires 46a is connected to an electrical current source and the appropriate indicator points 45a are activated, visually and/or storage-wise, by the input to produce a visual display in each matrix 40a.

In matrix stacks which are to be observed visually, it is desirable that the index of refraction of the glass or transparent plastic plates and barrier layers be close to that of the index of refraction of the electroflor material. When this is accomplished, the matrices will be substantially transparent, since there will be no discontinuities of refractive index within the matrix assemblies. Some applications of a substantially transparent multilayer device have been outlined. In a single matrix device, as described in FIGURE 5, such a transparent condition for example would permit a radar plan-position indicator to be built into a window or windshield of an aircraft, thus allowing clear vision through the windshield plus the radar image when desired. The pilot may then observe radar data without diverting his attention from operation of the aircraft.

The matrix layers or layer of my invention may be viewed either under visible light (including white light) or ultraviolet light, depending upon the electroflor indicator material employed. Further, electroflor compositions may combine the properties of visible color change and change of fluorescent color so that images produced within the matrix may be viewed either in visible light or under irradiation by ultraviolet light.

As has been mentioned, most of the electroflor solutions which I have investigated have the property of exhibiting a color change or luminescence at one electrode, usually the negative electrode. Thus, a matrix of electroflor cells which are designed so that the color change takes place at only one electrode, requires only that one electrode of the cell be separated by means of barriers or other means rather than separating both sets of electrodes, as previously described in FIGURES 3 to 7. Such a modified layer or matrix is shown in FIGURES 8 and 9.

Referring now specifically to FIGURE 8, a fragmentary cross-section of a flat matrix 76 is shown in perspective and comprises a pair of plates 78, 80 made of a transparent material such as glass or an appropriate plastic, the plate 78 having formed therein a series of parallel grooves or troughs 82. Electrode wire 84, or other electrically conductive material, is affixed onto the floor of the grooves 82 while another set of parallel electrode wires 86, normal to wires 84, are embedded or coated on the glass plate 80. It will thus be seen that the electrodes 84, 86 are spaced from each other by means of the crests 88 which define the grooves 82 while crossing over each other at a number of points or zones 89.

The plates 78, 80 are sandwiched together and the troughs 82 filled with the desired electroflor solution 90. The gasket sealing material (not shown) is applied around the periphery of the plates 78, 80 and the entire assemblage is tightly sealed so as to prevent leakage of the electroflor solution 90.

The electrode wires 84 and 86 are connected to appropriate sources of electrical energy as shown schematically in FIGURE 8 by electrical connection of a single electrode pair to a battery 92 operated by a switch 94. For purposes of illustration, assume a negative electroflor solution 90 is provided. If then electrode 86 is made the negative electrode, as indicated, in FIGURE 8, the color response will appear localized in the crossover point 89 in trough 82. The color zone will not spread further along electrode 86 because of crests 88, which prevents contact of electroflor solution with electrode 86, except at trough 82.

Referring now to FIGURE 9, a plurality of grooved matrices 76, as described with reference to FIGURE 8, are shown in cross-section and designated by numeral 96. Methods of activating and controlling current pulses to the matrix stack 96 is similar to those previously described, and is therefore indicated schematically only by battery 98 and switch 99. The plates of the layers and the electroflor compositions are all preferably transparent and also approximately equal in refractive index. Thus images produced within the matrix layers may be readily viewed, and three-dimensional effects obtained.

The electroflor material 90a within the matrices, may be types which, when electrically activated, exhibit a change from colorless to that of a visible color under visible light or display a change from a non-fluorescent state to a fluorescent state, or both.

It will be seen that there are many useful variations or arrangements of electrodes, electrode barriers, and matrix layers. The size, spacing and number of electrodes may vary between wide limits depending upon the desired image. For example, a plan-position altitude device to be used in an aircraft instrument panel may be made quite small while on the other hand a plan-position altitude indicator may be made quite large for convenient viewing by a number of persons simultaneously.

Figure 10:
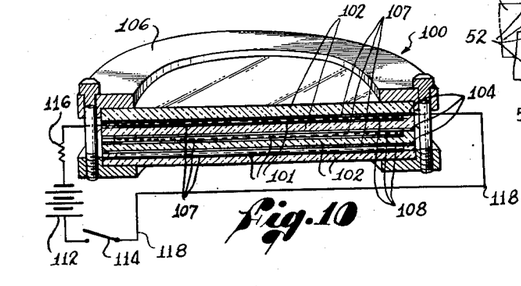
FIGURE 10 is a sectioned perspective view of a stack of individual cells embodying my invention, for color filter and other purposes.

The foregoing description has been directed to individual electroflor cells, as shown in FIGURES 2 and 2a and to crossed electrode matrix cell structures, as shown in FIGURES 3–9. These all are subject to the same voltage limitations described with reference to schematic cell 10. Another type of cell structure is shown in FIGURE 10, and comprises a stack or sandwich 100 of individual cells 101. The cell stack 100 has many useful applications; for example it is employed as a digital readout cell and as an electronically controllable light filter. The sandwich structure 100 shown in FIGURE 10 is particularly adapted for use as a light filter as will now be described.

The stack 100 comprises four glass, or transparent plastic, plates 102, each plate spaced from the other by peripherally mounted gasket material 104. The plates 102 are rigidly held together by a peripheral ring clamp 106.

Light transmissive electrode coatings 107 are affixed to adjacent faces of adjacent plates 102, and a colorless VSR electroflor 108 is provided between plates 102 so as to contact each adjacent set of electrodes 107. Thus, a stack 100 of three individual electroflor cells 101 are formed.

When employing the stack 100 as a color filter, the electroflor 108 in each of the three layers is of a different composition, and each layer when electrically activated gives the three visible subtractive primary colors. These primary colors may be obtained, for example, by employing Electroflor Compositions II, III and IV as the three electroflor layers 108. These electroflor compositions are colorless when non-activated, thus rendering the entire stack 100 colorless and transparent when non-activated.

The electrical activating control circuit for one of the cells 101 of the stack 100 is shown schematically by battery 112, switch 114 and a series ballast resistor 116 which are electrically connected to two adjacent electrodes 107 by leads 118.

When a suitable potential is applied, the cell 101 will give a visual response, in accordance with the particular electroflor in the cell, and the voltage applied. Any combination of color and intensity can be obtained by activating one or more of the three cells independently or simultaneously. The intensity of the coloration of the color filter can also be varied since the color response is linear with the applied current pulses, as described previously with reference to the schematic cell 10.

The presently preferred mode of activating the electroflor cells 101 is by applying a continuous voltage of the order 0.7–5 volts through a series ballast resistor. It appears that an equilibrium condition is thus set up whereby the zone of visual response is generated at the same rate as it is dissipated by molecular diffusion. If continuous voltage is applied in this manner, electrode reactions and damage to the cell will not occur.

The stack 100 of cells 101 can be increased to as many as is desired depending upon the end use. For example, if ten cells are placed in the stack and the electrode wire or coating, at which the color response occurs is applied to each cell in the form of numbers from 0 to 9, the application of voltage to a particular cell will cause the numeral electrode to color or fluoresce. Thus, a digital read-out cell stack for transistorized computers, or other low voltage applications is readily constructed.

It will be apparent that certain variations in the geometry of the cell structure for my electroflor materials or devices may be made for the purpose of accomplishing specific objectives. An example of a structural variation would be a simple indicator cell similar to that of FIGURE 2e, except that the cell is constructed in the form of a relatively long U-shaped or curved tube wherein the inner surface of the tube forms one electrode and the other electrode may be a wire or concentric tube within the first tube. In this variation, light may be directed so as to pass through the tube in such a way that it is reflected several times from the electrode wall of the tube, thereby increasing the tendency of the cell to absorb light. Such multiple reflections which pass through color zones present on the electrode surface, then more readily show the presence of such color zones, thus permitting usage of smaller activating currents or current pulse durations. Such multiple reflections could, of course, be accomplished by means of a variety of cell shapes and optical configurations.

An example of a usage variation would be in connection with a matrix similar to that of FIGURE 3. As mentioned previously, after generation of a visible display pattern or an invisible pattern of information in the form of stored current pulses within the matrix, the pattern experiences a natural decay or "afterglow" which, in the case of the visible zone, may be adjusted to any desired value from about one second to several minutes. The presence of stored electrical pulses can be detected up to several hours following cessation of the charging current.

In cases where it is desired to hold the stored data or visible pattern in a substantially permanent condition, it is possible to "freeze" the electroflor system, thereby preventing molecular diffusion and consequent deterioration of the pattern. Such freezing might be accomplished by actually lowering the temperature of the electroflor system to make the liquid freeze, or a thickening agent might be added which will set to a gel under certain controllable conditions. Unfreezing the system will release the trapped visible pattern and/or stored electrical data, that is, stored electrical information could not be read out of the matrix until the electroflor is unfrozen. A "frozen" pattern or display could be useful in the frozen state, since it could be examined visually or scanned by optical means.

While I have described in some detail several embodiments of my invention, it will be readily apparent that many changes and modifications may be made that lie within the scope of the invention. Therefore, I do not intend to be limited by the specific embodiments shown, but only by the appended claims.

I claim:

1. An electrically conductive liquid composition of matter, which comprises: a solvent selected from the group consisting of alcohols, glycols, glycol ethers, and water; an ionizable solute present in an amount of at least 0.01 percent but not greater than that percentage required for production of normal electrolytic reaction in the presence of positive and negative electrodes, and in no event greater than about 0.06 percent, said solute being selected from the group consisting of an acid, a base and a salt; and a hydrogen ion indicator present in an amount less than the saturation amount thereof.

2. The composition of matter of claim 1 characterized in that the indicator is selected from the group consisting of 1,3,6-tribromo-2-naphthol
1-naphthol-2-sulfonic acid, sod. salt
1-naphthol-4-sulfonic acid, sod. salt
Quinine sulfate
2,4-dichloro-1-naphthol
2-naphthol-7-sulfonic acid, sod. salt
Beta-methyl Umbelliferone
Phloxine
Eosine
5,7-dihydroxy dimethyl coumarin
5,7-dihydroxy-4-methyl coumarin
4,5-dihydroxy-2,7-naphthalene-disulfonic acid disodium salt
6-amino-1-naphthol-3-sulfonic acid
6-amino-2-naphthalene sulfonic acid
1-naphthol-5-sulfonic acid, sod. salt
2-naphthol-6,8-disulfonic acid, disodium salt
2-naphthol-6-sulfonic acid, sodium salt
7-amino-1,3-naphthalenedisulfonic acid
5-amino-1-naphthalenesulfonic acid
2-naphthol-3,6-disulfonic acid, disodium salt
2',7'-dichlorofluorescein
Acridine Orange RRR
2-4 dinitrophenol para-Nitrophenol
meta-Nitrophenol
Methyl Violet
Phenolphthalein
Phloxine
Eosine
Thymolphthalein
Thymol blue
Sodium nitrobenzene-azosalicylate
Orthocresolphthalein
Bromo cresol purple
Bromo thymol blue
Cresol red
Orthocresolphthalein (also fluoresces)
8-amino-1,5-naphthalenedisulfonic acid disodium salt
1-amino-2-naphthol-4-sulfonic acid
7-amino-1-naphthol-3-sulfonic acid
5-amino-2-naphthalenesulfonic acid
8-amino-1-naphthalenesulfonic acid
2-amino-1-naphthalenesulfonic acid
4-amino-1-naphthalenesulfonic acid
5-amino-2-naphthalenesulfonic acid
1-amino-2-naphthol-4-sulfonic acid
8-amino-2-naphthalenesulfonic acid sodium salt
6-amino-1,3-naphthalenedisulfonic acid disodium salt
2,4-dinitro-4'-hydroxydiphenylamine
Primuline
Fluorescein
2-amino-6-naphthalenesulfonic acid
2,4-dinitro-1-naphthol
Zinc-8-hydroxyquinoline
6-8-dinitro-2,4(1,H-3H,N) quinazolinedione
Quinaldine red
Congo red
Alizarin red 3. The composition of matter of claim 1 characterized in that said indicator is selected from those pH sensitive indicators having a color change-over point in the pH range of from about 2 to about 12.

4. A composition of matter according to claim 3 wherein the pH of said electrolyte is initially removed greater than one pH unit from the pH at which the pH indicator changes color, said composition upon activation, having the characteristics of a short afterglow period.

5. A composition of matter according to claim 3 wherein the pH at which said electrolyte is maintained initially within about one pH unit of the color-changeover point of said indicator, said composition, upon activation, having characteristics of a long afterglow period.

6. An electrolytic cell which comprises: a pair of electrodes adapted to be connected to an external source of controlled electrical energy; and an electrolyte comprising a substantially non-ionizable solvent and an ionizable solute present in an amount of greater than about 0.01 percent and less than that percentage required for normal electrode reactions to occur but not greater than about 0.06 percent.

7. An electroflor cell responsive to low voltage inputs which comprises: a pair of electrodes adapted to be connected to an external source of controlled electrical energy; and an electrolyte comprising a solvent selected from the group consisting of alcohols, glycols, glycol ethers, and water, an ionizable solute present in an amount less than required for normal electrode reactions to occur and less than about 0.06 percent, said solute being selected from the group consisting of acids, bases and salts, and a pH sensitive indicator, whereby a visual display of the electrical current input to the cell appears at one electrode.

8. A cell according to claim 7 in which the amount of ionizable solute present is greater than 0.01 percent.

9. The cell of claim 7 in which a thickening agent is added to the solution within the cell to reduce the speed of diffusion of the ions to normal position upon cessation of electrical input.

10. A cell according to claim 7 wherein said 0.06 percent ionizable solute comprises sufficient pH-controlling material selected from an acid or base to hold the pH of said electrolyte within a single unit of pH of the color changeover point of said pH-sensitive indicator, the remainder of the ionizable solute comprising an ionizable salt, said cell having the characteristics of a long afterglow period.

11. A cell according to claim 7 wherein the pH of said electrolyte, when non-activated, is substantially removed from the pH at which the pH indicator changes color greater than one pH unit, said cell having the characteristics of a short afterglow period.

12. A cell according to claim 9 in which the visual response occurs at a single electrode, said electrode being an electrically conductive coating applied to the inner face of the cell container whereby the visual response of said cell appears over the surface of the entire container.

13. A two-dimensional storage device which comprises: a plurality of spaced electrodes mounted on a first backing layer; a plurality of spaced electrodes mounted on a second backing layer, said electrodes on both first and second layers forming a series of spaced sets of crossover zones, the electrodes being connected to an external electrical circuit having control and activating means whereby each set of crossover zones is adapted to be individually electrically energized; and an electrically conductive solution communicating between each set of crossover zones, said solution comprising between about 0.01 percent to about 0.06 percent of ionizable material.

14. A two-dimensional electrical storage device which comprises: a first backing layer; a set of spaced electrodes mounted on said backing layer; a second backing layer; a second set of spaced electrodes mounted upon said second backing layer normal to said first set of electrodes but not contacting said first set thus forming a series of spaced crossover zones, each of said individual electrodes of each set being connected to an external electrical circuit having activation and control means; means for separating said electrodes comprising a perforate layer, said layer being perforated so as to isolate at least a portion of each crossover zone within the matrix; and an electrically conductive solution contacting the electrodes at each crossover zone, said solution including ionizable material of about 0.05 percent, thereby forming a plurality of electrolytic cells in accordance with the placement of the crossover zones.

15. A storage device according to claim 14 in which the electrically conductive solution includes a solvent for said ionizable material selected from the group consisting of alcohols, glycols, glycol ethers and water.

16. A storage device according to claim 15 wherein the electrically conductive solution includes a pH sensitive indicator.

17. A two-dimensional data storage and visual indicating device responsive to electrical energy input which comprises: a pair of parallel transparent plates; a first set of spaced parallel substantially invisible electrodes mounted to one face of one of said transparent plates; a second set of parallel spaced substantially invisible electrodes mounted to the other of said transparent plates normal to and adjacent said first set of electrodes and forming a series of crossover zones; a transparent barrier plate mounted between said transparent plates separating said first and second set of electrodes and having a series of holes therein, at least some of said holes being provided at each of the crossover zones; and an electrolytic VSR electroflor composition having about 0.01 percent to 0.05 percent ionizable content filling said holes to contact the electrodes in the crossover zones to thus form a plurality of visually responsive electroflor cells.

18. A device according to claim 17 in which the electroflor composition comprises a solvent selected from the group consisting of alcohols, glycols, glycol ethers and water, and an electroflor pH sensitive indicator selected from the group consisting of:

1,3,6-tribromo-2-naphthol
1-napthol-2-sulfonic acid, sod. salt
1-naphthol-4-sulfonic acid, sod. salt
Quinine sulfate
2,4-dichloro-1-naphthol
2-naphthol-7-sulfonic acid, sod. salt
Beta-methyl umbelliferone
Phloxine
Eosine
5,7-dihydroxy dimethyl coumarin
5,7-dihydroxy-4-methyl coumarin
4,5-dihydroxy-2,7-naphthalene-disulfonic acid disodium salt
6-amino-1-naphthol-3-sulfonic acid
6-amino-2-naphthalene sulfonic acid
1-naphthol-5-sulfonic acid, sod. salt
2-naphthol-6,8-disulfonic acid, disodium salt
2-naphthol-6-sulfonic acid, sodium salt
7-amino-1,3-naphthalenedisulfonic acid
5-amino-1-naphthalenesulfonic acid
2-naphthol-3,6-disulfonic acid, disodium salt
2',7'-dichlorofluorescein
Acridine Orange RRR
2-4 dinitrophenol
para-Nitrophenol
meta-Nitrophenol
Methyl Violet
Phenolphthalein
Phloxine
Eosine
Thymolphthalein
Thymol blue
Sodium nitrobenzene-azosalicylate
Orthocresolphthalein
Bromo cresol purple
Bromo thymol blue
Cresol red
Orthocresolphthalein (also fluoresces)
8-amino-1,5-naphthalenedisulfonic acid disodium salt
1-amino-2-naphthol-4-sulfonic acid
7-amino-1-naphthol-3-sulfonic acid
5-amino-2-naphthalenesulfonic acid
8-amino-1-naphthalenesulfonic acid
2-amino-1-naphthalenesulfonic acid
4-amino-1-naphthalenesulfonic acid
5-amino-2-naphthalenesulfonic acid
1-amino-2-naphthol-4-sulfonic acid
8-amino-2-naphthalenedisulfonic acid sodium salt
6-amino-1,3-naphthalenedisulfonic acid disodium salt
2,4-dinitro-4'-hydroxydiphenylamine
Primuline
Fluorescein
2-amino-6-naphthalenesulfonic acid
2,4-dinitro-1-naphthol
Zinc-8-hydroxyquinoline
6-8-dinitro-2,4(1,H-3H,N) quinazolinedione
Quinaldine red
Congo red
Alizarin red 19. A device according to claim 17 wherein the holes of the barrier plate have a smaller area than the area occupied by the electrodes at said crossover zones.

20. A device according to claim 17 wherein the refractive index of the transparent plates, the barrier plates and the electroflor solution are substantially the same.

21. A three-dimensional data storage and visual indicating device responsive to electrical energy input which comprises: a plurality of pairs of transparent plates parallel to each other; a first set of spaced parallel substantially invisible electrodes affixed to one adjacent face of each of said plate pairs; a second set of spaced parallel substantially invisible electrodes affixed to the other adjacent face of each of said plate pairs, said second set of electrodes being normal to said first set of spaced electrodes thereby forming a plurality of electrode crossover zones; a transparent barrier plate mounted between each pair of plate pairs and separating said first and second sets of electrodes, each barrier plate having a series of transverse holes therethrough, at least some of said holes being provided at each of the crossover zones; and an electrolytic VSR electroflor composition having between about 0.01 percent to 0.05 percent ionizable content filling said holes to contact the electrodes in the crossover zones to thus form a plurality of visually responsive indication zones.

22. A two-dimensional matrix of electroflor cells which comprises: a first plate having a series of spaced grooves within a first face thereof; a plurality of first electrodes affixed within said grooves and adapted to be connected to external activation and control electrical circuits; a cover plate affixed to the grooved face of said first plate; a plurality of spaced second electrodes mounted between said first and cover plates and adapted to be connected to external electrical activation and control circuits, said second electrodes being mounted approximately normal to, and spaced from said first electrodes to form a series of grid-like spaced crossover zones; an electrolytic electroflor composition having about 0.05 percent ionizable content provided within the grooves to contact intermittent sections of the second electrodes and continuous sections of the first electrodes to thereby form a series of grid-like electroflor cells.

23. A matrix of electroflor cells according to claim 22 in which the electrolytic electroflor composition is of the VSR type and in which the second electrodes are the electrodes at which a color response occurs in accordance with electrical activation.

24. A matrix according to claim 22 in which the electroflor composition comprises a solvent selected from the group consisting of alcohols, glycol ethers, glycols, and water, and an electroflor pH sensitive indicator selected from the group consisting of:

1,3,6-tribromo-2-naphthol
1-naphthol-2-sulfonic acid, sod. salt
1-naphthol-4-sulfonic acid, sod. salt
Quinine sulfate
2,4-dichloro-1-naphthol
2-naphthol-7-sulfonic acid, sod. salt
Beta-methyl umbelliferone
Phloxine
Eosine
5,7-dihydroxy dimethyl coumarin
5,7-dihydroxy-4-methyl coumarin
4,5-dihydroxy-2,7-naphthalene-disulfonic acid disodium salt
6-amino-1-naphthol-3-sulfonic acid
6-amino-2-naphthalene sulfonic acid
1-naphthol-5-sulfonic acid, sod. salt
2-naphthol-6,8-disulfonic acid, disodium salt
2-naphthol-6-sulfonic acid, sodium salt
7-amino-1,3-naphthalenedisulfonic acid
5-amino-1-naphthalenesulfonic acid
2-naphthol-3,6-disulfonic acid, disodium salt
2',7'-dichlorofluorescein
Acridine Orange RRR
2-4 dinitrophenol
para-Nitrophenol
meta-Nitrophenol
Methyl Violet
Phenolphthalein
Phloxine
Eosine
Thymolphthalein
Thymol blue
Sodium nitrobenzene-azosalicylate
Orthocresolphthalein
Bromo cresol purple Bromo thymol blue
Cresol red
Orthocresolphthalein (also fluoresces)
8-amino-1,5-naphthalenedisulfonic acid disodium salt
1-amino-2-naphthol-4-sulfonic acid
7-amino-1-naphthol-3-sulfonic acid
5-amino-2-naphthalenesulfonic acid
8-amino-1-naphthalenesulfonic acid
2-amino-1-naphthalenesulfonic acid
4-amino-1-naphthalenesulfonic acid
5-amino-2-naphthalenesulfonic acid
1-amino-2-naphthol-4-sulfonic acid
8-amino-2-naphthalenesulfonic acid sodium salt
6-amino-1,3-naphthalenedisulfonic acid disodium salt
2,4-dinitro-4'-hydroxydiphenylamine
Primuline
Fluorescein
2-amino-6-naphthalenesulfonic acid
2,4-dinitro-1-naphthol
Zinc-8-hydroxyquinoline
6-8-dinitro-2,4(1,H-3H,N) quinazolinedione
Quinaldine red
Congo red
Alizarin red 25. A matrix of cells according to claim 22 wherein the plates, electrodes and electrolyte are transparent and the refractive index of said plates, electrodes and electrolyte are substantially the same.

References Cited in the file of this patent

UNITED STATES PATENTS

| | | |
|---|---|---|
| 1,412,514 | Coulson | Apr. 11, 1922 |
| 1,505,656 | Martus | Aug. 19, 1924 |
| 1,808,498 | Engle | June 2, 1931 |
| 1,868,710 | McCullough | July 26, 1932 |
| 1,891,780 | Rutherford | Dec. 20, 1932 |
| 2,387,313 | Wilson | Oct. 23, 1945 |
| 2,569,510 | Wolf | Oct. 2, 1951 |
| 2,698,915 | Piper | Jan. 4, 1955 |
| 2,708,748 | Straube | May 17, 1955 |
| 2,749,480 | Ruderfer | June 5, 1956 |
| 2,758,079 | Eckfeldt | Aug. 7, 1956 |
| 2,839,472 | Nevalonny | June 17, 1958 |
| 2,847,615 | Engelbart | Aug. 12, 1958 |
| 2,884,381 | Rodgers | Apr. 28, 1959 |

OTHER REFERENCES

Kolthoff and Rosenblum: Acid-Base Indicators, pub. 1937 by the MacMillan Co. of N.Y., page 148.

McDonald et al.: Measurement of Ion Migration, article in Science, vol. 112, August 25, 1950, pp. 227–229, 204/180S.

Electrochemistry, Fourth ed., vol. I, page 133, pub. 1943 by John Wiley & Sons of N.Y.